Aug. 16, 1932.    F. J. HARDMAN    1,871,988
WINDSHIELD WIPER
Filed April 5, 1929    2 Sheets-Sheet 1
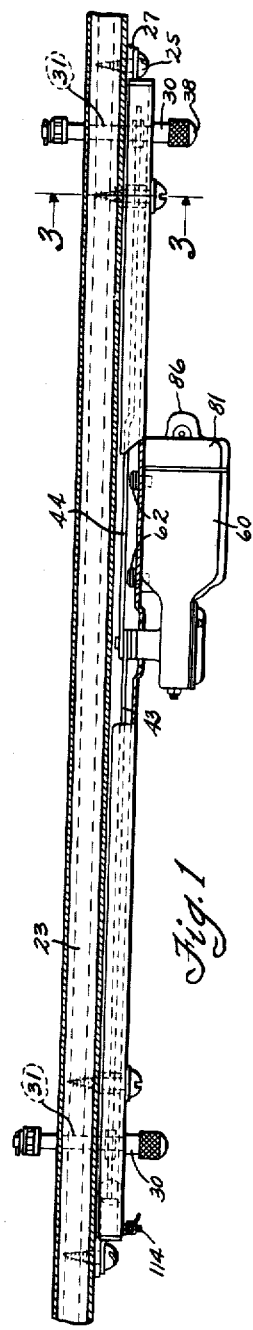
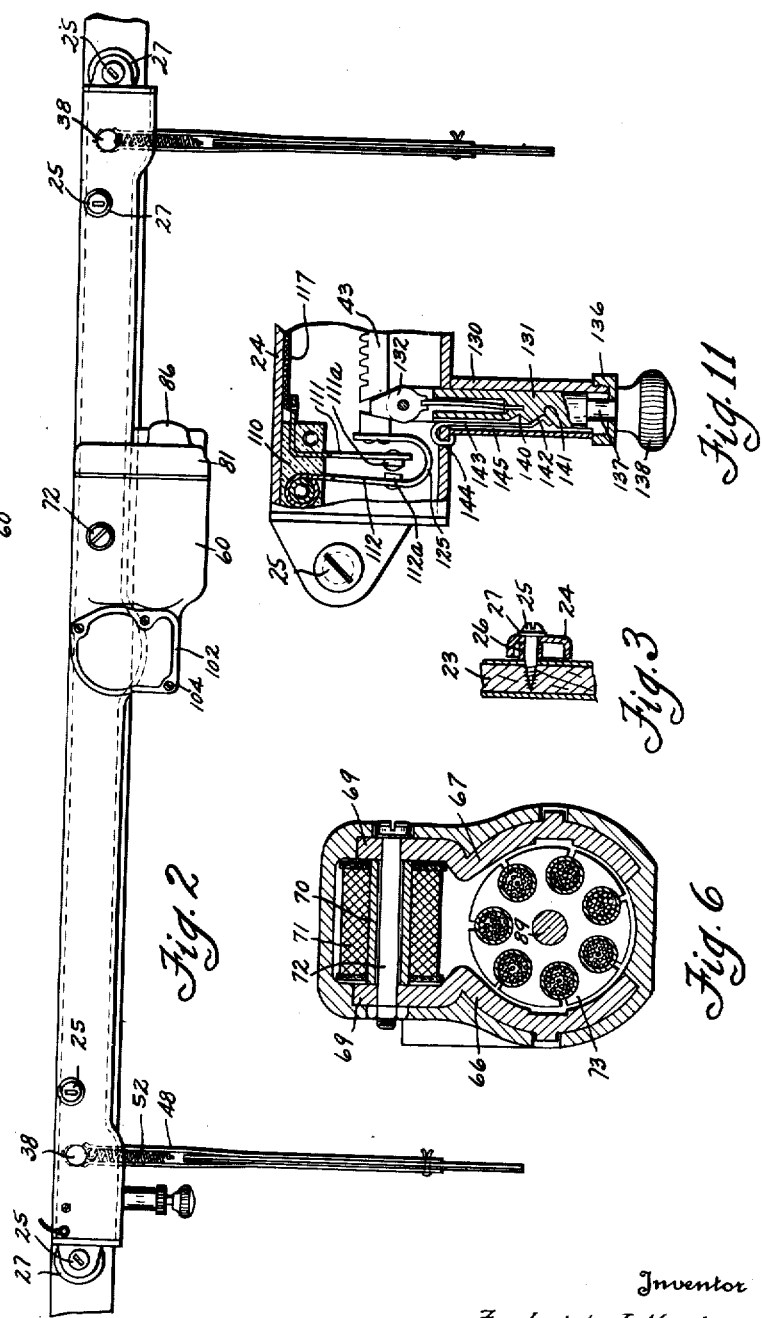
Inventor
Frederick J. Hardman
By Spencer, Hardman & Fehr
His Attorneys

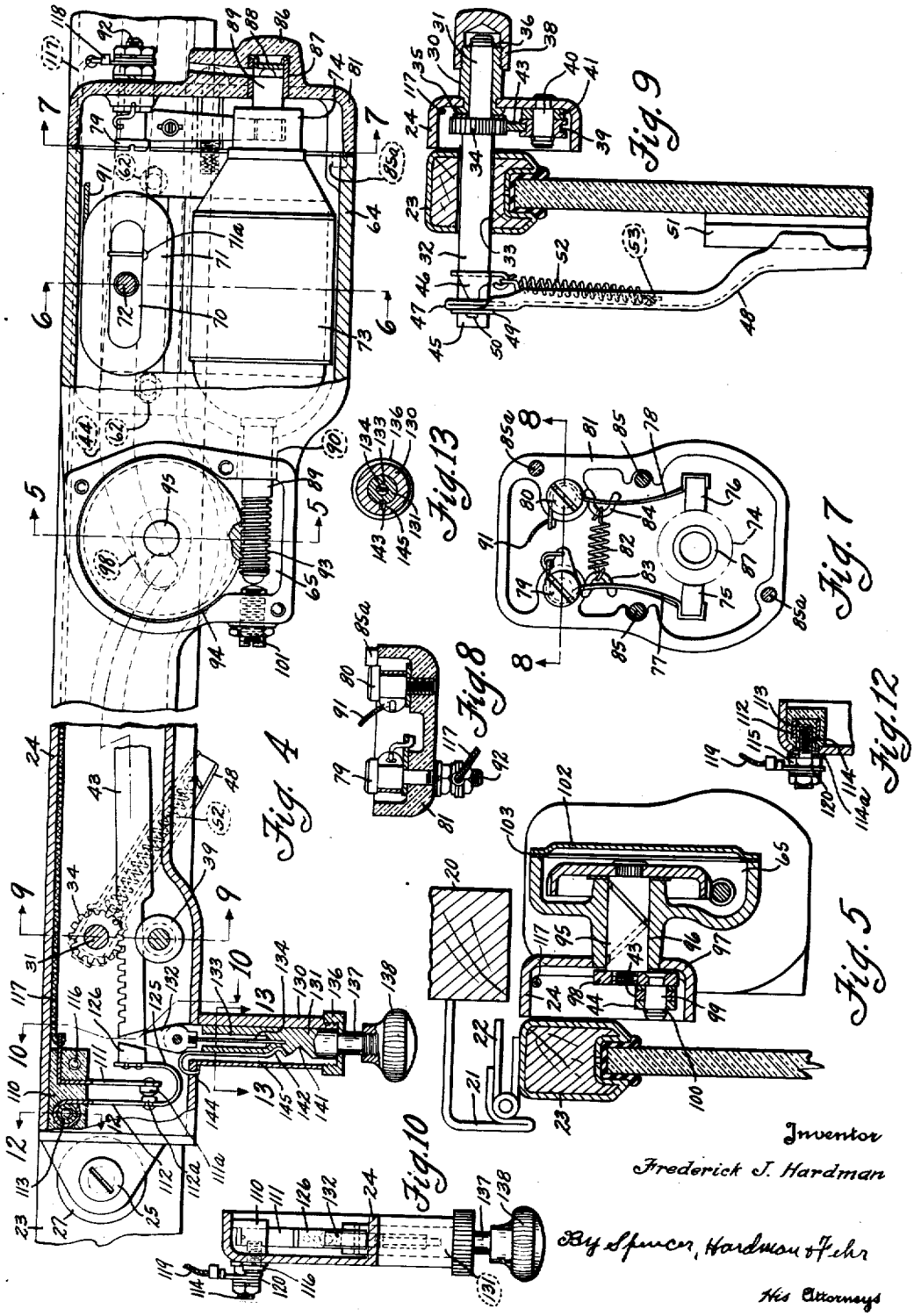

Patented Aug. 16, 1932

1,871,988

UNITED STATES PATENT OFFICE

FREDERICK J. HARDMAN, OF DAYTON, OHIO, ASSIGNOR TO DELCO-REMY CORPORATION, OF ANDERSON, INDIANA, A CORPORATION OF DELAWARE

WINDSHIELD WIPER

Application filed April 5, 1929. Serial No. 352,839.

This invention relates to improvements in windshield cleaners, and particularly to those operated by an electric motor mechanically connected to the wiper mechanisms by a transmission mechanism including a reciprocable element.

It is an object of the instant invention to provide a circuit interrupter in conjunctive relation with definitely operating parts of the device, so that the operation of the driving motor and the wiper mechanism may be controlled to cause the wiper mechanism to stop at the end of a stroke, and to resist coasting of the mechanism beyond the predetermined point at which it is to stop.

Another object of this invention is to insure stopping of the wiper mechanism at a predetermined point in the cycle of wiping movement.

Further objects and advantages of the present invention will be apparent from the following description, reference being had to the accompanying drawings wherein a preferred embodiment of one form of the present invention is clearly shown.

In the drawings:

Fig. 1 is a plan view of a windshield cleaner illustrating my invention, certain parts of the structure being broken away and shown in section for clearness of illustration.

Fig. 2 is an elevational view of the same as appears substantially from the driver's seat, or a position within the vehicle body.

Fig. 3 is a section on the line and in the direction of the arrows 3—3 of Fig. 1, illustrating the method of supporting the mechanism upon the vehicle structure.

Fig. 4 is an enlarged detail view with parts shown in section, illustrating the driving motor and the transmission mechanism in their relative association with the control means.

Fig. 5 is a section through the motion translating mechanism as viewed along the line and in the direction of the arrows 5—5 of Fig. 4.

Fig. 6 is a view in section of the driving unit substantially as viewed along the line and in the direction of the arrows 6—6 of Fig. 4.

Fig. 7 is a view in elevation of the motor housing cover as appears along the line and in the direction of the arrows 7—7 of Fig. 4.

Fig. 8 is a section through the motor housing cover illustrating a means for supporting the motor brushes, as appears along the line and in the direction of the arrows 8—8 of Fig. 7.

Fig. 9 is a sectional view through the wiper shaft substantially as viewed along the line and in the direction of the arrows 9—9 of Fig. 4.

Fig. 10 is a sectional view through the mounting bracket showing the control mechanism in elevation and is a view taken substantially along the line and in the direction of the arrows 10—10 of Fig. 4.

Fig. 11 is a fragmentary view in section of the controller mechanism similar to that shown in Fig. 4, but with the controller moved to the motor stopping position.

Fig. 12 is a sectional view through the controller mechanism as viewed along the line and in the direction of the arrows 12—12 of Fig. 4.

Fig. 13 is a detail of the contact support, being a sectional view along the line and in the direction of the arrows 13—13 of Fig. 4.

With particular reference to the drawings 20 indicates a forward portion of the body enclosure, which forms one of the bounding rails of the windshield opening and has attached thereto a channel or bracket member 21, to which are fixed hinged members 22, supporting a windshield frame rail 23 carrying the glass of the windshield. Upon the rail 23 there is mounted a channel member 24 which provides a support for the wiping mechanism and driving motor, and which also forms a housing for the motion translating mechanism connecting the driving motor with the wiper mechanism.

The channel member 24 is of elongated formation as generally exhibited in Figs. 1 to 4 inclusive, and is held in spaced relation to the windshield rail 23 by screws 25 and spacers 26 inserted between the channel member 24 and the rail 23, substantially as viewed in Fig. 3. Resilient washers 27 of some preferred compressible material as rubber or soft fiber are placed between the screw heads and the channel member for reducing vibration and quieting the operation of the device.

Near each end of the channel member 24, there is provided a bearing sleeve 30, which rotatably supports a wiper arm shaft 31 having a driving extension 32 extending through a transverse aperture 33 in the windshield rail 23. The wiper shaft 31 is fixed to a pinion 34, and supports a bearing washer 35 within the channel member 24, and is retained within the bearing sleeve 30 by a spring wire split-ring 36. A cap 38 threaded upon the end of the sleeve 30 provides a receptacle to hold lubricant for the shaft 31, and encloses the split-ring 36. Within the channel member and in substantial vertical alignment with the pinion 34, there is secured an idler or guide roller 39 journalled upon a stud 40 riveted to the channel member 24. A spacing washer 41 is located upon the stud 40 between member 24 and the roller 39. One of the rack bars 43 and 44 is guided by the roller 39 which maintains the bar in mesh with the pinion 34, and has an operative connection with a driving motor presently to be described. The driving end 32 of the wiper shaft 31 is provided with a portion 45 which drivingly engages a spring clip 46, a driving shank 47 of a wiping arm 48, and a washer 49 secured thereto by means of a cotter pin 50. Each of the wiping arms 48 pivotally supports a wiping blade 51 which is urged into contacting relation with the windshield glass by a spring 52 connected with a tongue 53 struck from the arm 48 and with the spring clip 46 as illustrated in Fig. 9.

The channel member 24, provides a support for a driving motor 60, which is fixed to the member 24 intermediate of the wiper shafts 31 by mounting screws 62 as illustrated in Figs. 1 and 4. In the illustrated form, the driving motor 60 is embodied in a die cast member providing a motor housing 64, and a compartment 65 for motion translating mechanism connecting the motor shaft with the rack bars 43 and 44, hereinbefore referred to.

The power device within the housing 64, in the present instance is an electric motor which requires magnetic field pieces. The housing 64 being of die cast metal is of non-magnetic material so that the common practice of using the housing as a magnetic field must be dispensed with. Hence separate magnetizable field pieces 66 and 67 are provided in the form of liners within the housing, the field pieces being separately formed pieces inserted into the die-casting mold before the housing is cast. The field pieces 66 and 67 are provided with parallel extensions 68 and 69, which support a core 70 and field windings 71, by means of a bolt or screw 72. The opposite ends of the field pieces 66 and 67 are shaped to conform to the contour of an armature 73 of the electric power device.

The armature 73 has a commutator 74, engaged by brushes 75 and 76 carried by brush holders 77 and 78 respectively, which are pivotally supported on studs 79 and 80, respectively, the studs being mounted within the end cover 81 which is formed of molded insulating material. Brushes 75 and 76 are urged into engagement with the commutator 74 by a spring 82 interposed between the brush holders and secured thereto by insulating loops 83 and 84 secured to each brush holder.

The insulating cover 81 fits over the open end of the motor housing 64 and provides a cover therefor, and also provides an insulating support for the brush holder studs 79 and 80. The cover is secured to the motor housing by screws 85 which cooperate with the alignment studs 85a received in complementary recesses in the motor housing to maintain the motor bearings in correct alignment. A lug 86 formed on the cover is recessed to receive a bearing sleeve 87 and a thrust cup 88, which provide a bearing for supporting one end of an armature shaft 89 of the armature 73, said armature shaft being journalled also in a bearing 90 carried by the partition member separating the chambers 64 and 65 in the motor frame. Wire 91 connects brush holder 78 with the field winding 71 grounded at 71a upon the core 70. The brush holder 77 is connected with a junction binding screw 92 located upon the end cover 81.

The end of the armature shaft 89, extending into the chamber 65 is provided with a worm 93 meshing with a worm wheel 94 rotatably supported within the compartment 65 by a shaft 95 journalled in a bearing 96 formed in the back wall of the chamber 65. The channel member 24 is provided with an apertured embossment 97 for receiving the end of the bearing 96; and the motor 60 is so mounted upon the channel member 24 that the end of the shaft 95 protrudes within the embossment 97 exterior of the bearing 96. To shaft 95 is attached a crank member 98 supporting a crank pin 99 rotatably securing the rack bars 43 and 44 by means of a spring wire split-ring 100.

The gear housing compartment 65 is provided with an adjustable thrust bearing 101 for adjusting the motor within its bearings. The chamber 65 is packed with grease or other suitable lubricant, and then provided with a transmission cover 102 and a gasket 103 which are secured in place by the screws 104.

With this structure, means are provided which cooperate with the moving parts of the transmission mechanism for controlling the operation of the wiper mechanism and the starting and stopping of the power device therefor, and are manifest in a device which cause the driving motor to stop under such conditions that the wiper mechanism will always come to rest at a predetermined point in the cycle of its movement and preferably at the end of a stroke. This is accomplished by mounting at one end of the channel member 24, a contact device such as that illustrated in Figs. 2, 4, 10 and 11. The contact device is supported so as to be optionally actuatable by the motion translating mechanism, in the present instance, by a reciprocable member or one of the rack bars driving the wiper shaft. This contact device is controlled by a manually shiftable member which may be moved into and out of the path of the reciprocable member, so that the reciprocable member will be conditioned to actuate, or be free from engagement with the contact device, in order that the mechanism may be stopped and started as desired.

This contact device comprises a block of non-conducting material 110 moldably securing a pair of contact members 111 and 112 carrying contact points 111a and 112a respectively as illustrated in Figs. 4 and 11. The blade 112 is secured to an insert 113 which threadedly receives a stud 114 provided with a non-conducting washer 114a and nut 115, which cooperate with a screw 116 to secure the block 110 to the channel member 24 as illustrated in Fig. 12. The contact blade 111 is attached to a wire 117 which is located along the channel member 24 and connected with the stud 92 through the attaching clip 118; and the blade 112 is connected through the insert 113 and stud 114 to a desired source of current by a lead 119 secured to the stud 114 through a terminal clip 120.

The contact blade 112 is of the bowed formation exhibited in Figs. 4 and 13 which provides a resilient arm 125 supporting a buffer block 126 in close juxtaposition to a moving part of the transmission, as the end of a rack bar 43. The contact device is so constructed and arranged, and positioned within the channel member 24 in relation to the moving parts of the transmission mechanism, that during the normal operation of the wiper mechanism, the contact device will be free from engagement by the moving part of the transmission mechanism, and will remain in circuit closed relation. Under proper conditions however, one of the contact blades may be moved by a part of the transmission mechanism for accomplishing the purpose desired. It will be noticed from the illustration in Fig. 4, that normal movement of the rack bar 43 will approach close to, but will not engage the member 126, thus the contact blades 111 and 112, due to their resilience and to their normally engaging relation will maintain the motor circuit closed, by which the cleaning mechanism will continue to operate.

Means are provided for actuating the contact device through movement of the transmission mechanism in the following manner. A supporting tube 130 is secured to the housing 24 and carries a control member 131 pivotally supporting an interposed member 132 and capable of reciprocation within the supporting tube 130 so as to move the interposed member 132 into and out of position for transmitting motion from the member 43 to the block 126. The control member 131 is bored at 133 for reception of a leaf spring 134, having a free end in interposed engagement with the member 132, tending to keep this member in aligned relation for insertion between the rack bar 43 and the block 126 upon movement of the control member 131. Inward movement of the control 131 will present the member 132 in such relation with respect to the members 43 and 126 that movement of the member 43 toward the left will result in separation of contact 112a from contact 111a at the end of the wiper arm stroke toward the left as viewed in Fig. 4. The pivotal relation between the members 131 and 132 also contributes to the actuation of the contacts by the bar 43 since the block 132 may move relative to those members and more freely aid in translating the motions of the member 43 to the contact 112. Spring 133 tends to return the interposed block 132 to normal position.

As before stated, the control member 131 is reciprocable within the tubular extension 130, its movement being limited by a cap 136 threaded upon the member 130 and engaging the shank 137 of the member 131. A control knob 138 secured to the stem 137 acts as a stop to limit the movement of the member 131 in one direction, while the shoulder joining the parts 131 and 137 limits movement in another direction. The member 131 is provided with detent recesses 140 and 141, which alternately receive a deformed end 142 of a detent spring 143, fixed to the housing 24 at 144 and located within longitudinal groove 145 of the tubular support 130.

From the structure described it will be seen that the controller 131 may be moved inwardly or outwardly with respect to the tubular support 130, which will consequently move the interposed member 132 into a position between the member 43 and the block 126. When the interposed member is so positioned then the member 43 in its movement toward the left as viewed in Fig. 4, will engage the block 132 causing it to pivot about its support on the member 131 and actuate the contact blade 112 into circuit open relation with respect to the blade 111, thereby causing the motor to stop. By pulling out the knob 138 the block 132 is removed from its motion transmitting position thereby permitting the switch contacts 111a and 112a to be closed and the wiper mechanism to be operated. It will be noticed that the interposed member 132 is of greater width than the minimum space between the members 43 and 126, so that when member 132 is manually interposed between those members, the circuit through the contacts 111 and 112 will be opened.

Aside from the switch contact feature just described, the blade 112 with its bowed extension 125 provide a buffer tending to restrain the movements of the rack bar 43 beyond the end of the stroke. In other words, as soon as the rack bar 43 engages the interposed member 132 the resilient property of the member 112 comes into operation and resists further reciprocable movement of the member 43, quickly bringing it to rest, after the switch contacts 111a and 112a are separated, thereby minimizing the coasting effect of the motor and transmission mechanism after the motor circuit has been opened. Fig. 11 illustrates the association of the parts in which stopping of the mechanism has been effected, or the positions in which the elements are associated when the mechanism is at rest.

When it is desired to start the mechanism upon its operative cycle, the controller is withdrawn by the knob 138 so that the deformation 142 rests within the recess 140, in which condition the elements are associated as viewed in Figs. 4 and 10 with the interposed member 132 withdrawn from position between the reciprocable member 43 and the buffer block 126. The space between the member 43 and 126 is of such dimension, that during the normal operation of the mechanism, reciprocation of the bar 43 will not actuate the contact device to open the circuit through the blades 111 and 112. However, when the interposed member 132 is projected into that space the rack bar 43 will cause the block 126 to be engaged and pushed aside as illustrated in Fig. 11 so that the circuit through the contacts 111 and 112 will be opened to stop the motor, and so that the resilience of the members 112 and 125 may be applied toward restraining further movement of the rack 43.

It will be noted from the illustration that the movement of the block 126 and the separation of the contacts 111a and 112a occur substantially at or near the end of the reciprocable movement of the rack bar 43 and consequently, at or near one end of the oscillatory stroke of the wiper arm 148 toward the left as viewed in Fig. 4. The advantage which results from this construction is that the driver is not required to manipulate the wiper motor switch in order to bring the wiper arm into a position which will not interfere with the driver's vision.

While the form of embodiment of the present invention as herein disclosed, constitutes a preferred form, it is to be understood that other forms might be adopted, all coming within the scope of the claims which follow.

What is claimed is as follows:

1. In a windshield cleaner, a wiper shaft, an electric motor, motor driven instrumentalities connected with said wiper shaft for effecting movement thereof, said instrumentalities including a rack bar, means guiding and supporting said rack bar, a motor switch having an actuator located in proximity to a part of the rack bar, and means movable into and out of position between said actuator and said rack bar part for causing motion to be transmitted from the rack bar part to the actuator.

2. In a windshield cleaner, a wiper shaft, motor driven instrumentalities connected with said wiper shaft, a motor for driving said instrumentalities, said instrumentalities including a rack bar, means supporting and guiding said rack bar, a pair of contacts on said supporting means, and means for producing relative movement of the contacts comprising a member to be interposed between the rack bar and one of the contacts and moved by the rack bar for controlling the operation of the motor.

3. In a windshield cleaner, a wiper shaft, motor driving instrumentalities connected with said wiper shaft, said instrumentalities including a reciprocable member, means supporting and guiding said reciprocable member and supporting a pair of contacts, means for producing relative movement of the contacts by selectively moving an interposed member bodily between the reciprocable member and the contacts, so that the switch may remain closed or may be opened by the reciprocable member at a predetermined point in the cycle of movement of the wiper shaft.

4. In a windshield cleaner, a wiper shaft, motor driven instrumentalities connected with said wiper shaft, a motor for driving said instrumentalities, said instrumentalities including a reciprocable member, a motor switch having an actuator, and means interposable between the said reciprocable member and the switch actuator for causing the reciprocable member to move the switch actuator.

5. In a windshield cleaner the combination comprising, a driving motor, a wiper mechanism, transmission mechanism connecting the same, and means actuated by said transmission mechanism for stopping said driving motor at a predetermined point in a cycle of movement of the wiper mechanism, said means including, a motor switch actuator and buffer mechanism located adjacent a longitudinally moving part of the transmission mechanism and so positioned as to be normally out of engagement therewith, and a motion transmitting part interposable between said moving part of said transmission mechanism and the switch actuator and buffer mechanism.

6. In a windshield cleaner the combination comprising, a driving motor, a wiper mechanism, transmission mechanism including a reciprocable member connecting the same, transmission buffer and switch contact mechanism adapted for operation by said transmission mechanism, and means for causing motion to be transmitted to said buffer and switch mechanism from said reciprocable member, whereby said transmission mechanism will stop substantially at a predetermined point in its cycle of movement.

7. In a windshield cleaner, the combination comprising, a wiper shaft, a driving motor and transmission mechanism including a reciprocable member, a controller for said motor including a resilient switch actuator and buffer located in proximity to the reciprocable member, and means for causing motion to be transmitted by the reciprocable member to the switch actuator.

8. A windshield cleaner, comprising in combination, a wiper shaft, a driving motor and transmission mechanism therefor including a reciprocable member, a controller for said motor including a resilient switch actuator located in proximity to the reciprocable member, a manually controlled member movable by the mechanism for operating the switch actuator, and means for interposing the manually controlled member between the reciprocable member and the switch actuator.

9. In a windshield cleaner, the combination comprising, a wiper shaft, a driving motor and transmission mechanism therefor including a reciprocable member, a controller for said motor, including a resilient switch contact carrier and buffer located in proximity to the reciprocable member, and a member movable into or out of position, for transmitting motion from the reciprocable member to the contact carrier.

10. In a windshield cleaner, the combination comprising, a wiper shaft, a driving motor and transmission mechanism therefor including a reciprocable member, a controller for said motor, including a resilient switch contact carrier and a buffer located in proximity to the reciprocable member, and means for causing motion to be transmitted from the reciprocable member to the resilient contact carrier.

11. In a windshield cleaner the combination comprising, a driving motor, a wiper mechanism, transmission mechanism connecting the same, and means actuated by said transmission mechanism for stopping said driving motor at a predetermined point in a cycle of movement of the wiper mechanism, said means including a longitudinally movable part of said transmission mechanism, a flexible motor switch actuator located in the path of said longitudinally movable part but beyond the extent of its travel so as to be normally out of engagement therewith, a motion transmitting part interposable between the said movable part and the switch actuator so that the movable part will be operable to flex the switch actuator.

In testimony whereof I hereto affix my signature.

FREDERICK J. HARDMAN.